(12) United States Patent  
Jothimani (10) Patent No.: US 8,448,255 B2
(45) Date of Patent: May 21, 2013

(54) SECURE FILE PROCESSING (75) Inventor: Premkumar Jothimani, Tamil Nadu (IN)

(73) Assignee: Apple Inc., Cupertino, CA (US)

( * ) Notice: Subject to any disclaimer, the term of this patent is extended or adjusted under 35 U.S.C. 154(b) by 1172 days.

(21) Appl. No.: 12/172,841

(22) Filed: Jul. 14, 2008

(65) Prior Publication Data

US 2010/0011447 A1    Jan. 14, 2010

(51) Int. Cl.
*G06F 12/14* (2006.01)
*G06F 7/06* (2006.01)

(52) U.S. Cl.
USPC ............ 726/27; 713/187; 713/188; 713/193; 713/194

(58) Field of Classification Search
None
See application file for complete search history.

(56) References Cited

U.S. PATENT DOCUMENTS

| 5,551,038 | A  | * | 8/1996 | Martin ......................... 713/100 |
| 6,466,983 | B1 | * | 10/2002 | Strazza ........................ 709/227 |
| 6,691,230 | B1 |   | 2/2004 | Bardon |
| 6,836,888 | B1 | * | 12/2004 | Basu et al. .................... 718/104 |
| 7,725,737 | B2 | * | 5/2010 | Konanka et al. ............. 713/190 |
| 8,103,779 | B2 | * | 1/2012 | Belkin et al. ................. 709/227 |
| 2002/0066022 | A1 | * | 5/2002 | Calder et al. ................. 713/200 |
| 2008/0005472 | A1 |   | 1/2008 | Kahlidi et al. |

* cited by examiner

*Primary Examiner* — Philip Chea
*Assistant Examiner* — Fatoumata Traore
(74) *Attorney, Agent, or Firm* — Blakely, Sokoloff, Taylor & Zafman LLP (57) ABSTRACT

Apparatus, systems, and methods may operate to receive requests to securely process files on an untrusted client. Additional activity may include transparently redirecting file management operations associated with applications running on the untrusted client to file content associated with the files, where the file content is located in a sandbox on the untrusted client, where the sandbox is inaccessible to the applications. A data store, shared across the applications, may be used to share information associated with the file content. Additional apparatus, systems, and methods are disclosed.

20 Claims, 4 Drawing Sheets

SECURE FILE PROCESSING

LIMITED COPYRIGHT WAIVER

A portion of the disclosure of this patent document contains material which is subject to copyright protection. The copyright owner has no objection to the facsimile reproduction by anyone of the patent disclosure, as it appears in the United States Patent and Trademark Office patent records, but otherwise reserves all copyright rights whatsoever. Copyright 2008 Novell, Inc.

BACKGROUND

With the advent of the secure sockets layer (SSL) protocol, the realization of secure virtual private network (VPN) communications between network nodes has been simplified. Thus, for example, SSL VPN technology enables users to securely access networks from workstations where no thin client is pre-installed. This makes it suitable for mobile users connecting to secure networks for secure file processing via public Internet kiosks, for example.

However, this type of use also raises some security issues. For example, one such issue includes granting a request for VPN access from an untrusted public terminal. Once the request is granted, it is possible for valuable corporate resources to be left behind on the untrusted terminal after the access session is complete.

SUMMARY

In various embodiments, apparatus, systems, and methods that support secure file processing are provided. For example, in some embodiments, such processing is provided by receiving a request to securely process files on an untrusted client, and then transparently redirecting file management operations associated with applications running on the untrusted client to file content located in a sandbox on the untrusted client, where the sandbox is inaccessible to the applications. A data store shared across the applications may be used to share information associated with the file content. Additional embodiments are described, and along with the foregoing example, will be set forth in detail below.

DETAILED DESCRIPTION

There are many approaches undertaken by different vendors in order to provide SSL VPN functionality. One such approach is to develop Java™ applet-based clients for supported applications, such as file transfer protocol (FTP) and Telnet protocol. These client applications can be pushed to client terminals when SSL VPN access is requested. The controlled provision of a client application makes the implementation of a sandbox on the client relatively easy. However, this approach is not always used.

For example, the SOCKS and SSL protocols may be used together to provide secure VPN access for any application client used on the VPN. In this case, the client application is not provided by the host, and different solutions are needed.

This situation, among others, may be addressed by implementing a transparent encrypted sandbox for storing file content accessed during an SSL VPN session. In some embodiments, files processed during SSL VPN sessions can be protected from attack or pilferage by storing their content in the sandbox on a VPN client, where the sandbox is created during connection initialization, and destroyed when the connection is terminated.

The sandbox functions to store file content created/updated during a VPN session, and may take the form of a pre-configured folder. File content can be encrypted prior to storage in the sandbox. When the VPN connection is terminated, data inside the sandbox can be purged. Client applications are not permitted to access the sandbox directly. Rather, the applications access empty files that have their content stored in the sandbox. All of these operations can occur in a transparent manner.

As used herein, an "application" refers to a set of software instructions, a service, or a system that interacts with data housed at a "data source," which refers to a volume or collection of volumes that house the data for applications.

The terms "local," "remote," "source," and "destination" are relative, which means that when something is designated as being "local" or a "source," then this refers to an entity or resource operating within the environment in which the applications operate against the master data source and volume. Conversely, when something is designated as being "remote" or a "destination," then this refers to an entity or resource operating within an environment where a replicated volume is being maintained.

A "sandbox" is a directory or other designated area where file content can be stored and processed, and which is not directly accessible by the applications processing the files associated with the content.

"Transparent" access means that access to files by applications is conducted by the applications in the same manner as in other contexts. However, the actual processing of the content in conjunction with file management operations by the applications is done in a location that is not known to the application.

In some embodiments, such as those that make use of Novell® SSL VPN kiosk mode client functions, network input/output (I/O) related system calls are hooked. "Hooking" refers to the process of gaining control of an application whenever it makes system calls of particular interest. Once an application is hooked, network I/O related system calls that involve data destined for a protected network can be redirected, perhaps using an SSL VPN thin client. The data can be sent to the protected network using a SOCKS protocol secured with the SSL protocol.

For example, if the Microsoft® Windows® operating system is used, hooking can be achieved by creating a remote thread in the application to be hooked. Instruction pointer addresses for the system calls to be hooked are modified to point to desired thin client functions.

For hooking Linux® or Apple® Macintosh® computer applications, the desired applications can be started in a SHELL environment where the LD_PRELOAD variable is set to point to the thin client sandbox library so that system calls of interest are overridden, and control is taken away from the application making the system call when the library is invoked by the application.

The sandbox is made operational by hooking file management related system calls, such as open, creat (e.g., in case of Linux® and Macintosh® software applications), and CreateFile (e.g., for Windows® operating system applications), among others. Once the system call is hooked, the file path is rewritten to point to an administrator-configured sandbox location (e.g., a folder path in the system). Thus, instead of operating on a file in a location that is known to the application, operations are directed to content in the sandbox that has a location unknown to the application.

In order to share information about files in the sandbox, a shared data store across all applications can be maintained. The shared data store permits a file created by one application, with its content stored inside the sandbox, to be accessible to other applications in use during the same VPN session. In some embodiments, this data store can be set up to maintain a record for each file stored in the sandbox. For example, the following fields may be present in each record:

File Name—random file name chosen for each file added to the sandbox;
Actual Path—including actual file name requested by the calling application;
Encryption Key—cryptographic key used for encryption and stored after XORing with file creation time or a similar nonce;
Reference Count—tracks the number of active applications currently making use of the file in the sandbox; and
Delete Flag—marks the file for deletion.

The sequence of operations used in some embodiments to realize the sandbox functionality described herein may begin when an application is hooked with a preselected sandbox library that is designed to intercept file management related system calls (e.g., application calls such as create, open, write, read, close, and delete). Then, the sandbox library can be invoked whenever an application invokes a call to open a file (e.g., with a write or append flag as parameter), such as using a creat or CreateFile command, or some other appropriate system call for obtaining a new file handle.

At this point, the sandbox library can operate to intercept system file management operation calls. If the requested path points to a file inside the sandbox (e.g., a user is attempting to open sandbox files directly), access is denied by returning an appropriate error code. Otherwise, the shared data store is checked by comparing the application-provided filename and path to the actual path in the data store for files already present in the sandbox. If no matching entry is found, then a new file is created inside the sandbox.

To create a new sandbox file, an empty file in the path requested by the application is created. This maintains sandbox transparency with respect to the user. Thus, once a file is downloaded by the user, the downloaded file can be accessed at the same location to which it was downloaded. However, the file content is in reality stored inside another file in the sandbox, perhaps in encrypted form, with a randomly-assigned name that is known only to the operating system, and not to the user or the application.

Therefore, the creation of the new sandbox file can be initiated by generating a random string to use as filename for the file content inside the sandbox, generating a cryptographic key (e.g., using a pseudo-random number generation system), creating a file with the random string as its name inside the sandbox, and inserting a descriptive record into the data store. The file handle that points to the file inside the sandbox can then be returned. The shared data store may contain records with data formatted as:

<Random Filename >,<Actual Filename, Path>,<Key XOR Nonce>,
<Reference Count=1>, <Delete Flag=0>

If the prior search for a matching entry is successful, and the matching file record does not indicate that the delete flag is set (e.g., Delete Flag=1), then a new file handle/file descriptor can be created with the name specified in the data store (e.g., instead of a new random name in the first field), and the record Reference Count can be incremented.

If the system call comprises one of the family of write system calls, and if the file corresponding to a supplied file handle is present in the shared data store and the file delete flag is not set, then data to be written to the file can be encrypted (e.g., using a stream cipher algorithm) by using the key available in the data store. Similarly, if the system call comprises one of the family of read system calls, and if the file corresponding to supplied file handle is present in the data store and the file delete flag is not set, then the data to be read can be decrypted (e.g., using an appropriate stream cipher algorithm) by using the key available in the data store.

In response to a remove or delete system call, the Delete Flag is set in the data store. The empty file created in the actual path requested by the application is deleted. The data of the corresponding file inside the sandbox is purged, but the file itself is not deleted until the Reference Count reaches zero, and the Delete Flag is set.

In response to a system call that comprises one of the family of close system calls, if the file corresponding to file handle is present in the data store, then the Reference Count is decremented. If the Delete Flag is set and the Reference Count has reached zero, then the entry for that file is removed from the shared data store.

Whenever calls are intercepted by the sandbox library, if the Delete Flag is set at the time an operation on a particular file inside sandbox is requested, the file handle is closed and an appropriate error is returned to the application. The Reference Count in the shared data store is also decremented at this time. If the reference count becomes zero, then the entry is removed from the shared data store.

Various embodiments of the invention can be implemented in existing network architectures, directory services, security systems, storage interfaces, operating systems, file system process, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, or applications. Any particular architectural layout or implementation presented herein is thus provided for purposes of illustration and comprehension only, and is not intended to limit the various embodiments.

Figure 1:
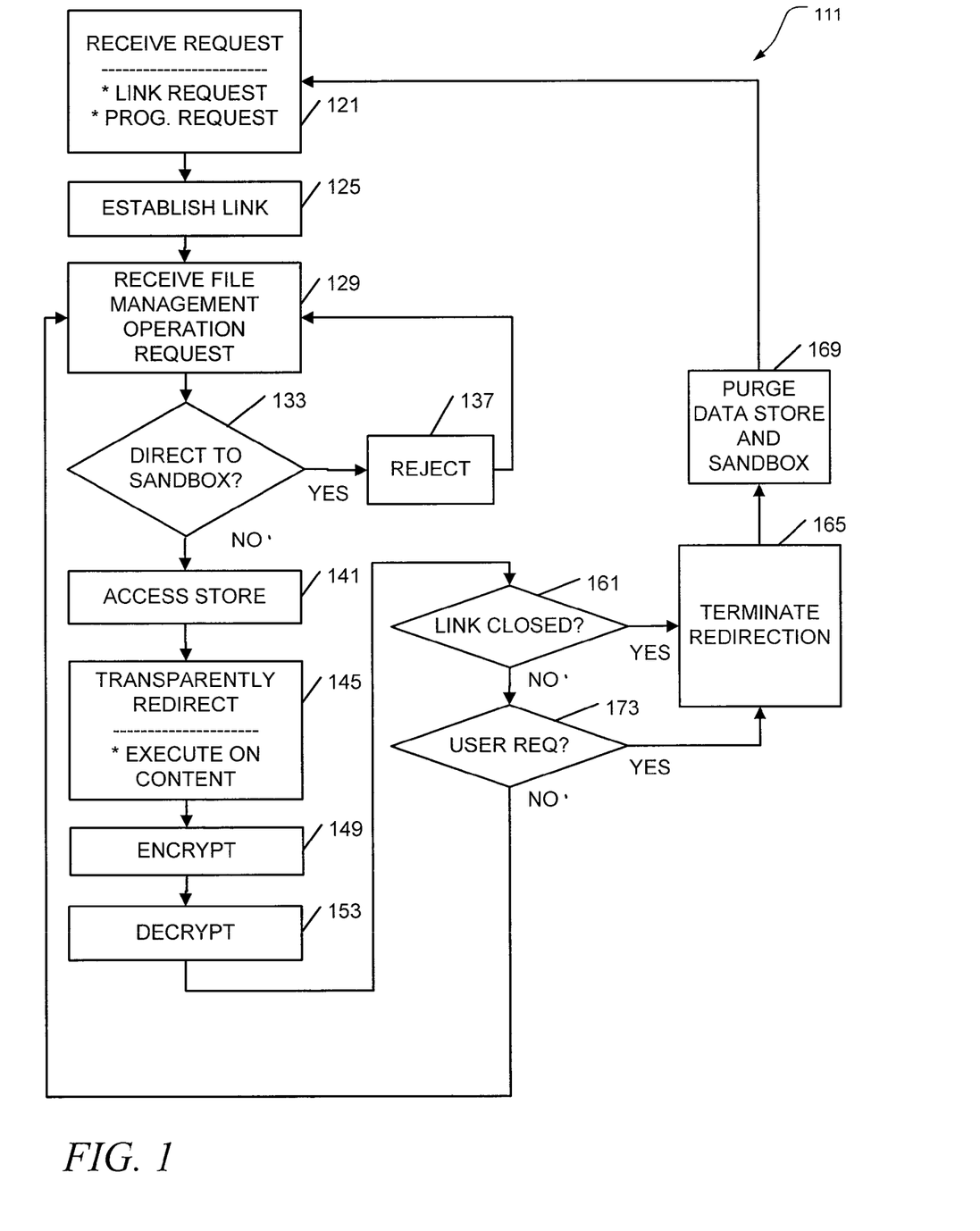
FIG. 1 is a flow diagram illustrating secure file processing methods according various embodiments of the invention.

FIG. 1 is a flow diagram illustrating secure file processing methods 111 according various embodiments of the invention. The methods 111 are implemented in a machine-accessible and readable medium. The secure file processing methods 111 are operational over processes within and among networks. The networks may be wired, wireless, or a combination of wired and wireless. The methods 111 may be implemented as instructions, which when accessed by a machine, perform the processing depicted in FIG. 1. Given this context, secure file processing is now discussed with reference to FIG. 1.

In some embodiments, a method 111 of securely processing files may begin at block 121 with receiving a request to securely process files on an untrusted client. Receiving the request may comprise receiving a request to establish a communications link between the untrusted client and a secure network, or a user interface request, or both. That is, secure file processing may be initiated by the act of establishing a link between the untrusted client and a secure network, or in response to a specific request by the user of an untrusted client, such as clicking on a GUI button to initiate secure processing. Another way to initiate secure file processing is programmatically. For example, a sandbox library on the untrusted client may operate to expose a start method via an executable command file (e.g., a disk operating system (DOS) *.COM file).

The method 111 may continue on to block 125 with establishing a communications link as part of a VPN in response to receiving the request of block 121. That is, the communications link established may form part of a VPN. The method 111 may go on to block 129 with receiving a file management operation request.

Application file management operations that attempt direct access to the sandbox file content should generally be rejected. So, if it is determined that the file management operation includes a path that points directly to the sandbox at block 133, then the method 111 may include rejecting the file management operation at block 137, and returning to block 129 to receive another file management operation request.

If the file management operation requested is in order, then the method 111 may continue on to block 141 with sharing information associated with the file content using a data store shared across the applications. This activity may include accessing the data store using information associated with the file management operation to locate the file content in the sandbox. For example, the file management operation can supply a file name for an empty file, which is cross-referenced and redirected to actual file content in the sandbox using the information contained in the data store, as described previously.

Thus, the method 111 may continue, at block 145, with transparently redirecting the file management operation associated with applications running on the untrusted client to file content associated with the files, where the file content is located in the untrusted client sandbox that is inaccessible to the applications. Transparent redirection may comprise executing the file management operation on the file content, wherein the file management operation is associated with a requested path pointing to at least one empty file included in the files.

In some embodiments, the method 111 may go on to block 149 to include encrypting data to store as the file content in the sandbox when the file management operation comprises a write system call. Similarly, the method may include, at block 153, decrypting the file content in the sandbox when the file management operation comprises a read system call.

The method 111 may continue on to block 161 with determining whether the secure link has been closed. If so, then the method may go on to block 165 with terminating transparently redirecting the file management operation responsive to closing the communications link between the untrusted client and a secure network. If this occurs, then the method 111 may include purging information in the data store and the sandbox at block 169, responsive to terminating transparently redirecting the file management operation, prior to returning to block 121. In this way, once transparent redirection activity is complete, then the data store and sandbox can be purged of all file content, as well as references thereto.

If the link has not been closed, as determined at block 161, then the method 111 may continue on to block 173 with determining whether a user request has been received to terminate transparent redirection. If this is not the case, the method 111 may continue on to block 129, with receiving another file management operation request. Otherwise, the method 111 may continue on to block 165. In this manner, there are at least two ways to end secure file processing redirection activities: closing the link, or explicitly requesting termination of processing. Other embodiments may be realized.

Figure 2:
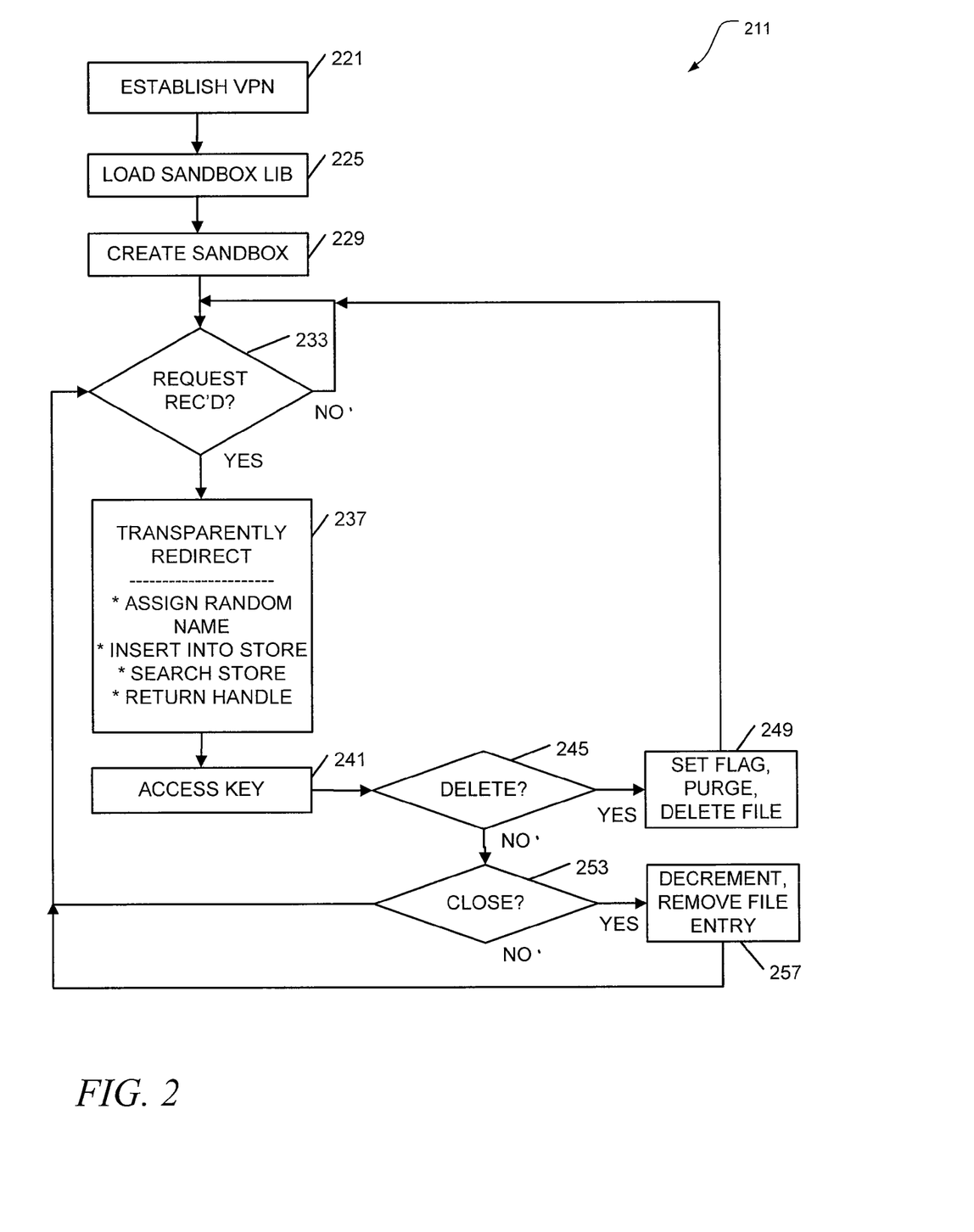
FIG. 2 is another flow diagram illustrating secure file processing methods according various embodiments of the invention.

For example, FIG. 2 is another flow diagram illustrating secure file processing methods 211 according various embodiments of the invention. In this case, secure file processing is described with additional emphasis on SSL VPN connections. The methods 211 are implemented in a machine-accessible and readable medium. The secure file processing methods 211 are operational over processes within and among networks. The networks may be wired, wireless, or a combination of wired and wireless. The methods 211 may be implemented as instructions, which when accessed by a machine, perform the processing depicted in FIG. 2. Given this context, secure file processing is now discussed with reference to FIG. 2.

To implement secure file processing, a method 211 may begin at block 221 with establishing a VPN SSL communications link between an untrusted client and a secure network. The method 211 may continue on to block 225 with loading a sandbox access library to be hooked into the untrusted client applications in response to establishing the VPN SSL communications link or a user interface request. Thus, in some embodiments, the sandbox library is loaded in response to a secure link being established, or an explicit user interface request.

The method 211 may continue on to block 229 with creating a sandbox to securely store file content associated with empty files accessible to the applications on the untrusted client, where the file content in the sandbox is inaccessible to the applications. If a file management operation request is not received at block 233, then the method 211 may wait at block 233 until such an operation is detected. Otherwise, the method 211 may continue on to block 237 with transparently redirecting file management operations associated with the applications, from the empty files to the file content.

The activity at block 237 may include, for new files, assigning a randomly assigned name to a file in the sandbox associated with the file content, and inserting a record into the shared data store, where the record includes the randomly assigned name and a name of one of the empty files. In this way, the shared data store can be used to cross-reference sandbox file content and empty files accessible to the applications.

The activity at block 237 may include, for files that have already been created, searching the data store using information associated with the file management operation to locate the file content in the sandbox, and returning a file handle pointing to a file in the sandbox that contains at least a portion of the file content. In this manner, the sandbox file can be accessed, using the data store, even though the file content is in a location that is unknown to the application that processes it. Thus, in most cases, the activity at block 237 includes sharing information associated with the empty files using the data store as it is shared across the applications.

The method 211 may continue on to block 241 with accessing an encryption or decryption key. The activity at block 241 may thus include accessing at least one of an encryption key or a decryption key stored in the data store to process the file content in order to encrypt data to store as file content, or to decrypt file content, respectively. In some embodiments, the encryption and/or decryption keys themselves may be encrypted.

When a delete or remove file operation is requested, the empty file known to the application is deleted, but the entry for the corresponding sandbox file is not necessarily removed. Thus, the method 211 may continue on to block 245 with determining whether a delete file operation has been requested. If so, the method may continue on to block 249 with setting a delete flag in the data store when the file management operation comprises a delete call, the delete flag being associated with an entry in the data store corresponding to the file content. The activity at block 249 may go on to include purging at least a portion of the file content without removing the entry from the data store, and deleting one of the empty files.

If the operation does not comprise a delete/remove operation, then the method may continue from block 245 on to block 253 to determine whether the operation comprises a file close operation. The entry for the sandbox file is removed once the reference count is zero and the delete flag is set. Thus, if the file operation comprises a close operation, the method 211 may continue from block 253 to block 257 with decrementing a reference count in the data store when the file management operation comprises a close call, and removing an entry for a file in the sandbox comprising a portion of the file content when the reference count reaches zero and a delete flag in the data store associated with the entry is set.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Many other embodiments may be realized.

Figure 3:
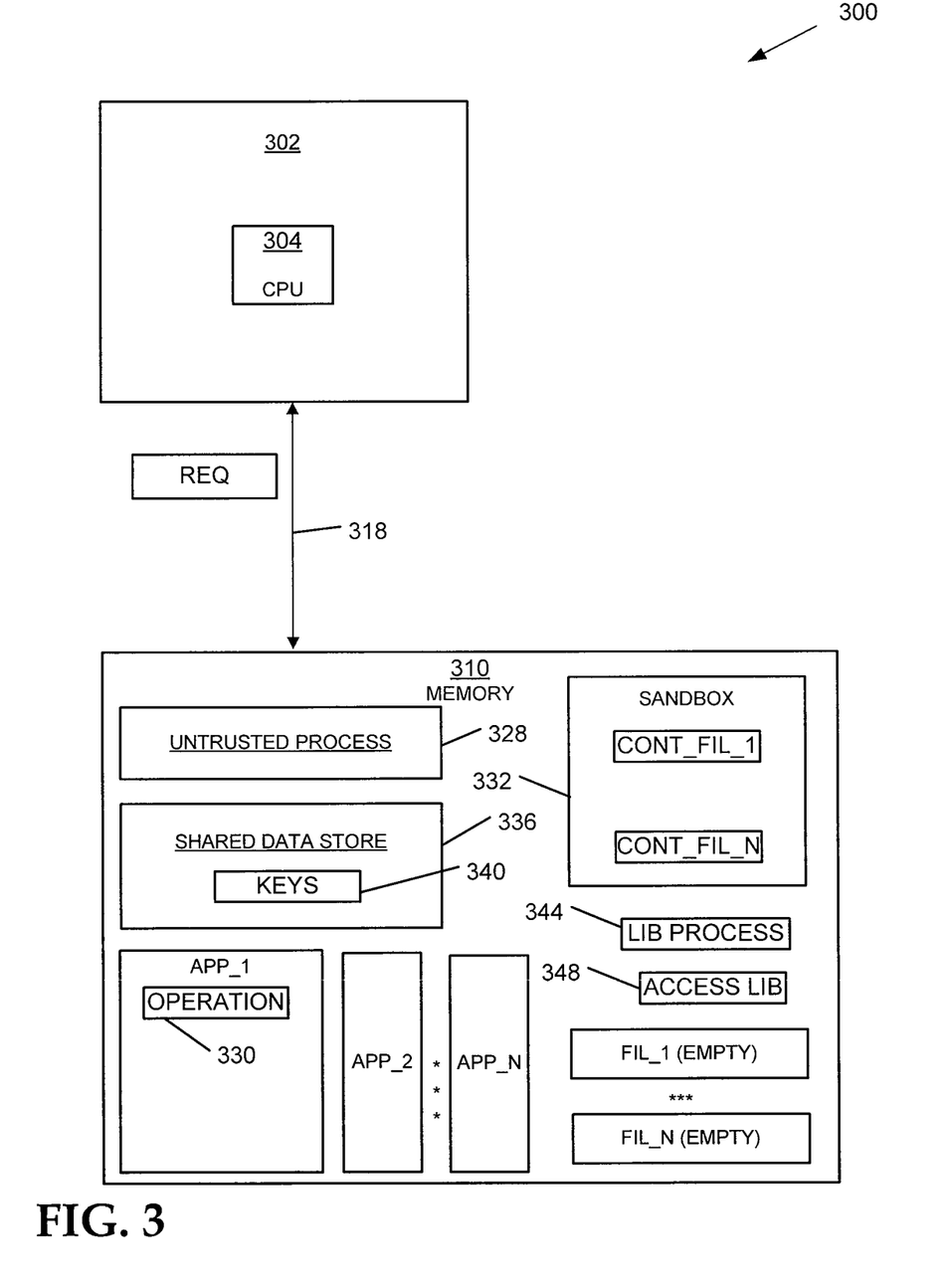
FIG. 3 is a block diagram of a secure file processing apparatus according various embodiments of the invention.

For example, FIG. 3 is a block diagram of a secure file processing apparatus 300 according various embodiments of the invention. In some embodiments, the apparatus 300 may comprise a memory 310 to store an untrusted client process 328, as well as a processor 304 to receive a request REQ to securely process files FIL_1 . . . FIL_N on the untrusted client process 328. The processor 304 may operate to transparently redirect one or more file management operations 330 associated with applications APP_1, APP_2, . . . , APP_N running on the untrusted client process 328 to file content (e.g., CONT_FIL_1 for FIL_1 and CONT_FIL_N for FILE_N) associated with the files FIL_1 . . . FIL_N. The file content CONT_FIL_1 . . . CONT_FIL N is located in an untrusted client sandbox 332 inaccessible to the applications APP_1, APP_2, . . . , APP_N.

The processor 304 may also operate to share information associated with the file content CONT_FIL_1 . . . CONT_FIL_N using a data store 336 shared across the applications APP_1, APP_2, . . . , APP_N. the shared information may comprise the information described previously with respect to the formatting of records in the shared data store 336 (e.g., random filename, etc.). In some embodiments, the processor 304 may operate to execute a process (e.g., library process 344) to load a sandbox access library 348 to hook into the applications APP_1, APP_2, . . . , APP_N responsive to receiving the request REQ.

The memory 310 may operate to store the data store 336, which in turn can be used to store keys 340, such as encrypted keys, for encrypting data to store as the file content CONT_FIL_1 . . . CONT_FIL_N. The keys 340 may also be used to decrypt the file content CONT_FIL_1 . . . CONT_FIL_N.

The secure file processing apparatus 300 can be implemented in a machine-accessible and readable medium and may be operational over one or more networks 318 (e.g., a local area network (LAN) or wide area network (WAN)). The networks 318 may be wired, wireless, or a combination of wired and wireless. The secure file processing apparatus 300 implements, among other things, the processing associated with the secure file processing methods 111 and 211 of FIGS. 1 and 2, respectively.

The apparatus 300 may comprise an execution element 302, such as a switch (e.g., an L4 switch), a server, a terminal, a personal computer, a workstation, or any combination of these. The memory 310 and the processor 304 may be included in a single execution element 302, such as a server, or exist as separate hardware elements (shown in FIG. 3), perhaps coupled together by a LAN. Modules may comprise hardware, software, and firmware, or any combination of these.

The execution element 302 may comprise a single entity, or several entities in communication with one another, such as one or more Novell® BorderManager® (NBM) proxy servers, Novell® Access Manager™ Linux® Access Gateways, or any intermediary that accomplishes secure file processing.

Figure 4:
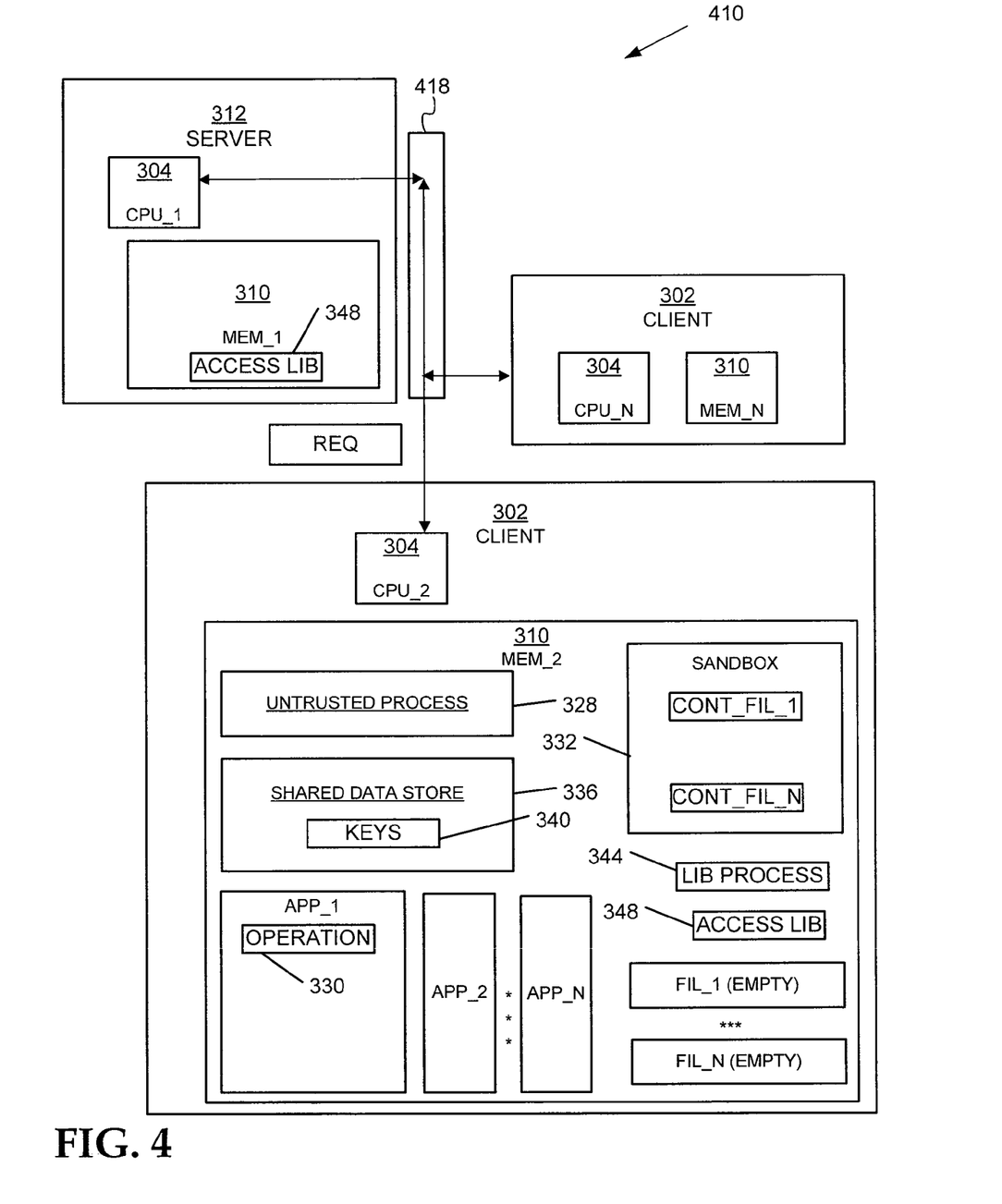
FIG. 4 is a block diagram of a secure file processing system according various embodiments of the invention.

FIG. 4 is a block diagram of a secure file processing system 410 according various embodiments of the invention. The secure file processing system 410 can be implemented in a machine-accessible and readable medium and is operational over one or more networks 418 (e.g., LANs and/or WANs). The networks 418 may be wired, wireless, or a combination of wired and wireless. The secure file processing system 410 can include multiple instances of the apparatus 300, and implements, among other things, the processing associated with the secure file processing methods 111 and 211 of FIGS. 1 and 2, respectively.

Turning now to FIG. 4, it can be seen that secure file processing system 410 may comprise at least one memory MEM_2 to store an untrusted client process 328, and one or more processors 304, each of which may be configured to operate as described with respect to the processor 304 of FIG. 3. The system 410 may further include a server 312 to establish a secure network communications link (e.g., via networks 418) with the untrusted client process 328.

In some embodiments, the system 410 may include a plurality of execution elements 302, perhaps comprising networked clients, to house a plurality of untrusted client processes 328. The server 312 may be used to store a sandbox access library 348, and to download the sandbox access library 348 to the untrusted client process 328 responsive to a request REQ for secure file processing that can be initiated in any of the ways described previously. In this way, the untrusted client 302 may operate to download the sandbox access library 348 from the server 312.

In some embodiments, a plurality of servers 312 can be used to house a plurality of processors 304. In some embodiments, the memories 310 and the plurality of processors 304 may form a portion of a symmetric multiprocessing architecture, perhaps housed together in a single server 312 (not shown).

Implementing the apparatus, systems, and methods described herein may thus provide the ability to store and process data accessed during VPN sessions in an encrypted format, transparent to the user, and without regard to the specific application client employed (e.g., third party FTP clients). For as long as the VPN connection is in place, users can access files created during the session in the usual manner. Files created/updated during the VPN session can then be purged when the VPN session is complete. This mechanism may thus assist in protecting the integrity of valuable corporate resources that might otherwise be accidentally left behind on an untrusted client when a VPN session is terminated.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
a memory to store an untrusted client process; and
a processor to receive a request to securely process files on the untrusted client process, to transparently redirect a file management operation associated with applications running on the untrusted client process to file content associated with the files, the file content located in an untrusted client sandbox inaccessible to the applications, wherein transparently redirecting comprises: executing the file management operation on the file content, wherein the file management operation is associated with a requested path pointing to at least one empty file included in the files, rejecting the file management operation when the file management operation includes a path that points directly to the sandbox, and to share information associated with the file content using a data store shared across the applications.

2. The apparatus of claim 1, wherein the memory is to store the data store having encrypted keys for encrypting data to store as the file content, and decrypting the file content.

3. The apparatus of claim 1, wherein the processor is to execute a process to load a sandbox access library to hook into the applications responsive to receiving the request.

4. A system, comprising:
a memory to store an untrusted client process;
a processor to receive a request to securely process files on the untrusted client process, to transparently redirect a file management operation associated with applications running on the untrusted client process to file content associated with the files, the file content located in an untrusted client sandbox inaccessible to the applications, wherein transparently redirecting comprises: executing the file management operation on the file content, wherein the file management operation is associated with a requested path pointing to at least one empty file included in the files, rejecting the file management operation when the file management operation includes a path that points directly to the sandbox, and to share information associated with the file content using a data store shared across the applications; and
a server to establish a secure network communications link with the untrusted client process.

5. The system of claim 4, comprising:
a plurality of networked clients to house a plurality of untrusted client processes, including the untrusted client process.

6. The system of claim 4, wherein the server is to store a sandbox access library, and to download the sandbox access library to the untrusted client process responsive to the request.

7. A method, comprising:
receiving a request to securely process files on an untrusted client;
transparently redirecting a file management operation associated with applications running on the untrusted client to file content associated with the files, the file content located in an untrusted client sandbox inaccessible to the applications, wherein transparently redirecting comprises:
executing the file management operation on the file content, wherein the file management operation is associated with a requested path pointing to at least one empty file included in the files; and
rejecting the file management operation when the file management operation includes a path that points directly to the sandbox: and
sharing information associated with the file content using a data store shared across the applications.

8. The method of claim 7, comprising:
accessing the data store using information associated with the file management operation to locate the file content in the sandbox.

9. The method of claim 8, comprising:
encrypting data to store as the file content when the file management operation comprises a write system call.

10. The method of claim 8, comprising:
decrypting the file content when the file management operation comprises a read system call.

11. The method of claim 7, comprising:
establishing a communications link as part of a virtual private network (VPN), responsive to receiving the request.

12. The method of claim 7, wherein receiving the request comprises:
receiving at least one of a request to establish a communications link between the untrusted client and a secure network, or a user interface request.

13. The method of claim 7, comprising:
terminating transparently redirecting the file management operation responsive to at least one of closing a communications link between the untrusted client and a secure network, or receiving a user interface request.

14. The method of claim 13, comprising:
purging information in the data store and the sandbox responsive to terminating transparently redirecting the file management operation.

15. A method, comprising:
establishing a virtual private network (VPN) secure sockets layer (SSL) communications link between an untrusted client and a secure network;
creating a sandbox to securely store file content associated with empty files accessible to applications on the untrusted client, the file content in the sandbox being inaccessible to the applications;

transparently redirecting a file management operation associated with the applications from the empty files to the file content;

sharing information associated with the empty files using a data store shared across the applications;

assigning a randomly assigned name to a file in the sandbox associated with the file content; and inserting a record into the data store, the record including the randomly assigned name and a name of one of the empty files.

16. The method of claim 15, comprising:

accessing at least one of an encrypted encryption key or an encrypted decryption key stored in the data store to process the file content in order to encrypt data to store as the file content, or to decrypt the file content, respectively.

17. The method of claim 15, comprising:

searching the data store using information associated with the file management operation to locate the file content in the sandbox; and returning a file handle pointing to a file in the sandbox that contains at least a portion of the file content.

18. The method of claim 15, comprising:

setting a delete flag in the data store when the file management operation comprises a delete call, the delete flag being associated with an entry in the data store corresponding to the file content;

purging at least a portion of the file content without removing the entry from the data store; and deleting one of the empty files.

19. The method of claim 15, comprising:

decrementing a reference count in the data store when the file management operation comprises a close call; and removing an entry for a file in the sandbox comprising a portion of the file content when the reference count reaches zero and a delete flag in the data store associated with the entry is set.

20. The method of claim 15, comprising:

loading a sandbox access library to be hooked into the applications in response to establishing the VPN SSL communications link or a user interface request.

\* \* \* \* \*